United States Patent
Lu et al.

(10) Patent No.: US 8,001,246 B2
(45) Date of Patent: Aug. 16, 2011

(54) SYSTEM AND METHOD FOR EXPOSING DISTRIBUTED TRANSACTION SERVICES AS WEB SERVICES

(75) Inventors: Chengdong Lu, Beijing (CN); Wei Chen, Beijing (CN); Mi Zhou, Beijing (CN); Yi Ding, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 470 days.

(21) Appl. No.: 11/867,633

(22) Filed: Oct. 4, 2007

(65) Prior Publication Data

US 2008/0294712 A1 Nov. 27, 2008

Related U.S. Application Data

(60) Provisional application No. 60/939,537, filed on May 22, 2007.

(51) Int. Cl.
*G06F 15/173* (2006.01)

(52) U.S. Cl. ........ 709/226; 709/224; 709/225; 709/228; 709/229; 709/230

(58) Field of Classification Search .................. 709/226, 709/227, 225, 228, 229, 230, 224
See application file for complete search history.

(56) References Cited

U.S. PATENT DOCUMENTS

| | | | |
|---|---|---|---|
| 6,985,901 B1 | 1/2006 | Sachse et al. | |
| 7,607,136 B2 | 10/2009 | Kuno et al. | |
| 7,716,234 B2 | 5/2010 | Naibo et al. | |
| 2003/0023957 A1 | 1/2003 | Bau, III et al. | |
| 2003/0120593 A1* | 6/2003 | Bansal et al. | 705/39 |
| 2003/0120822 A1 | 6/2003 | Langrind et al. | |
| 2003/0145096 A1 | 7/2003 | Breiter et al. | |
| 2003/0191806 A1 | 10/2003 | Osterberg, Jr. et al. | |
| 2003/0195762 A1* | 10/2003 | Gleason et al. | 705/1 |
| 2004/0088352 A1 | 5/2004 | Kurth | |
| 2006/0036448 A1 | 2/2006 | Haynie et al. | |
| 2006/0059107 A1* | 3/2006 | Elmore et al. | 705/64 |
| 2006/0179125 A1* | 8/2006 | Pavlik et al. | 709/219 |
| 2007/0282695 A1* | 12/2007 | Toper et al. | 705/26 |
| 2009/0049176 A1* | 2/2009 | Weinert et al. | 709/226 |

* cited by examiner

*Primary Examiner* — Jeffrey Pwu
*Assistant Examiner* — Abdelnabi Musa
(74) *Attorney, Agent, or Firm* — Fliesler Meyer LLP

(57) ABSTRACT

A computer enabled transaction service architecture gateway system and method for exposing distributed transaction services as web services comprises a transaction service gateway server including: a web service message engine to convert between web service messages and distributed transaction data structures and interface for allowing customized plug-in mechanism to expand functionality and provide additional service. The transaction service architecture gateway server operate to invoke distributed transaction services on a distribute transaction server upon receiving a request from a web service client.

19 Claims, 5 Drawing Sheets

SYSTEM AND METHOD FOR EXPOSING DISTRIBUTED TRANSACTION SERVICES AS WEB SERVICES

CLAIM OF PRIORITY

This application claims priority from the following application, which is hereby incorporated by reference in its entirety:

U.S. Provisional Application No. 60/939,537, entitled SYSTEM AND METHOD FOR CONFIGURATION-DRIVEN DEPLOYMENT, by Chendong Lu, filed on May 22, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of exposing existing Tuxedo services as standard Web services and providing access points to Tuxedo services through SOAP over HTTP/S protocol.

CROSS-REFERENCED CASES

The following application is cross-referenced and incorporated herein by reference:

U.S. patent application Ser. No. 11/867,635 entitled SYSTEM AND METHOD FOR CONFIGURATION-DRIVEN DEPLOYMENT, by Chendong Lu et al., filed on Oct. 4, 2007.

BACKGROUND

Tuxedo (Transactions for UNIX, Extended for Distributed Operations) is a middleware platform widely used to manage distributed transaction processing in distributed computing environments. It is a proven platform for unlocking enterprise legacy applications and extending them to a services oriented architecture, while delivering unlimited scalability and standards-based interoperability.

Web services are a set of functions packaged into a single entity that is available to other systems on a network, and can be shared by and used as a component of distributed Web-based applications. The network can be a corporate intranet or the Internet. Other systems, such as customer relationship management (CRM) systems, order-processing systems, and other existing back-end applications, can call these functions to request data or perform an operation. Because Web services rely on basic, standard technologies which most systems provide, they are an excellent means for connecting distributed systems together.

The software industry has evolved toward loosely coupled service-oriented applications that interact dynamically over the Web. The applications break down the larger software system into smaller modular components, or shared services. These services can reside on different computers and can be implemented by vastly different technologies, but they are packaged and accessible using standard Web protocols, such as XML and HTTP, thus making them easily accessible by any user on the Web.

Web services are defined to share the following properties that make them easily accessible from heterogeneous environments:

Web services are accessed using widely supported Web protocols such as HTTP.

Web services describe themselves using an XML-based description language.

Web services communicate with clients (both end-user applications or other Web services) through simple XML messages that can be produced or parsed by virtually any programming environment or manually, if necessary.

Major benefits of Web services include: Interoperability among distributed applications that span diverse hardware and software platforms; Easy, widespread access to applications using Web protocols; A cross-platform, cross-language data model (XML) that facilitates developing heterogeneous distributed applications.

SOAP is the most common Web Services protocol currently in use. While SOAP 1.1 is widely adopted for web service on the Internet, SOAP 1.2 is the first formal standard for web service. It is a significant advance over SOAP 1.1. SALT will support most features of SOAP 1.2 specification.
Summary of related SOAP 1.2 features:
SOAP Roles and SOAP Node
Processing SOAP Header
Processing SOAP Body
SOAP Versioning Model
SOAP Fault
SOAP MEP (Request/Response and One-Way)
SOAP HTTP Binding (POST Method)
SOAP RPC/Encoded and Document/Literal encoding style

DETAILED DESCRIPTION

Figure 1:
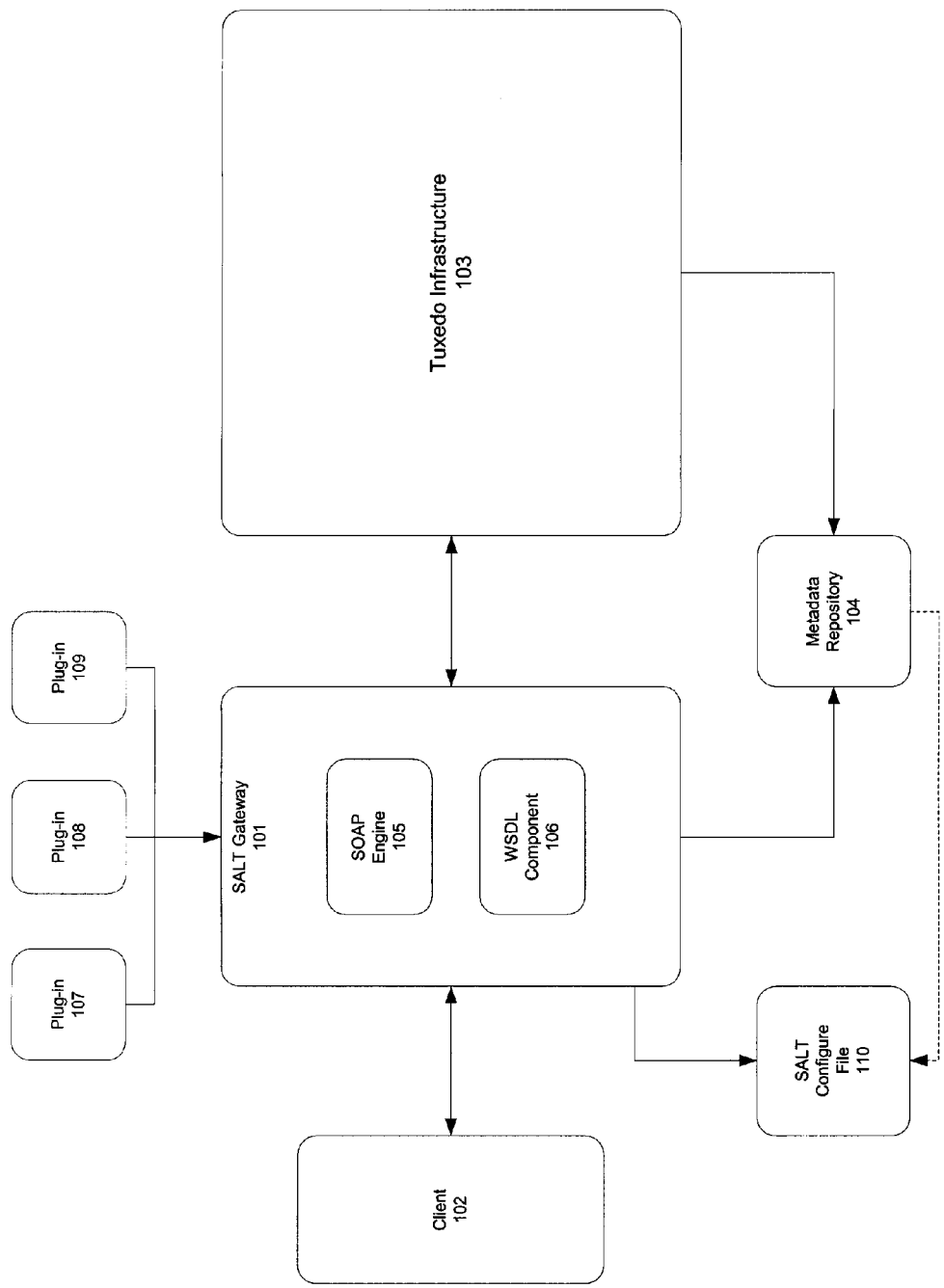
FIG. 1 is an illustration of an exemplary framework of BEA Service Architecture Leveraging Tuxedo (SALT) as an example for distributed transaction service architecture in accordance with one embodiment of the present invention.
Figure 2:
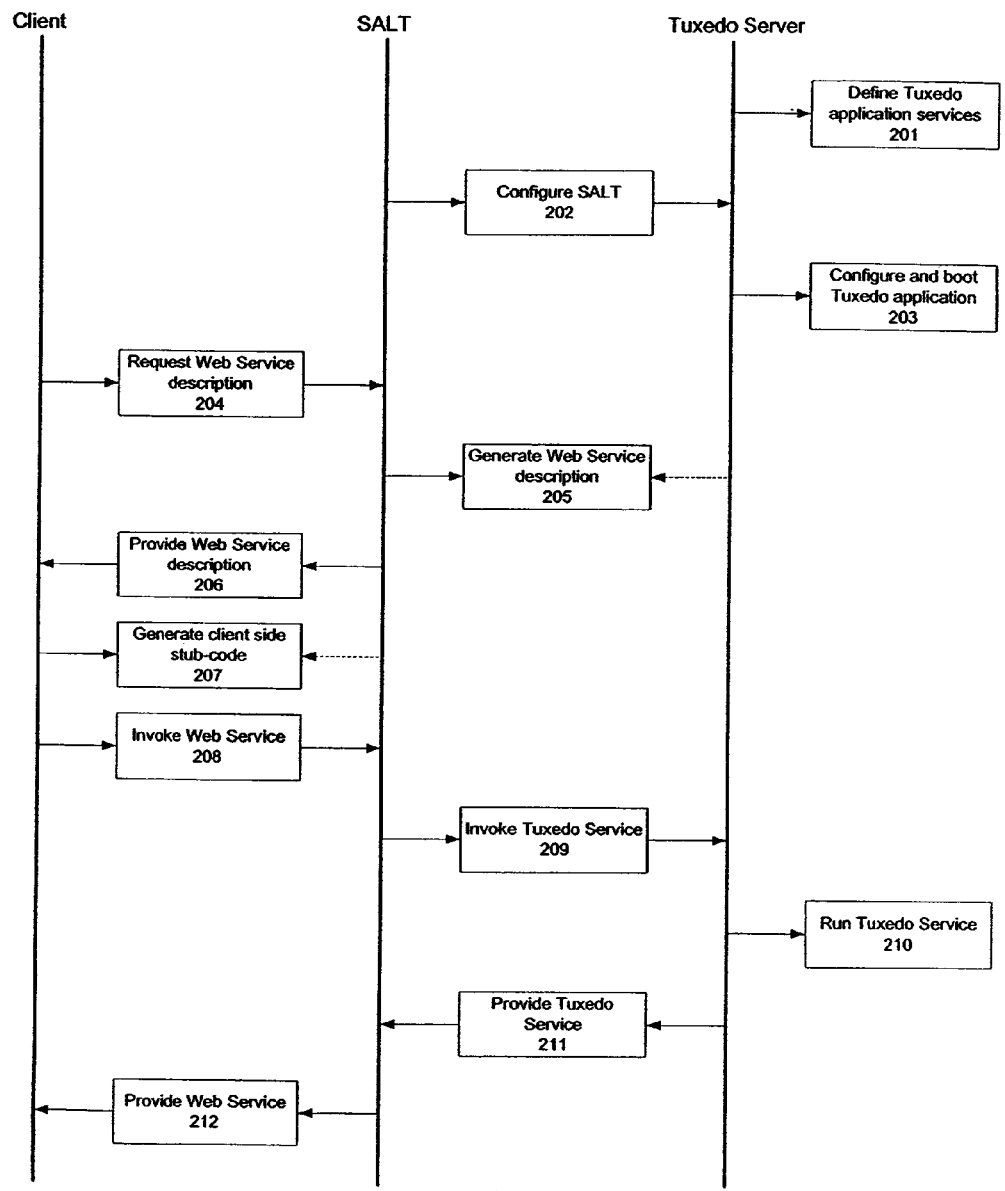
FIG. 2 is a flow chart illustrating an exemplary process to expose distributed transaction services as web services from service architecture in accordance with one embodiment of the invention.

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Tuxedo environment as an example for distributed transaction service environment and the BEA Service Architecture Leveraging Tuxedo (SALT) as an example for distributed transaction service architecture. More specifically, the description of the invention uses SALT Gateway or Web Service Gateway Server (GWWS) as an example for a distributed transaction service architecture gateway. It will be apparent to those skilled in the art that other types of distributed transaction service environment and distributed transaction service architecture can be used without limitation.

SALT—a Distributed Transaction Service Architecture

One Embodiment of the Present Invention is a Computer Enabled System that can expose distributed transaction services as web services to a client 102 from a distributed transaction application through a distributed transaction service infrastructure, such as a Tuxedo infrastructure 103. Such a computer enabled system can comprise a transaction service architecture gateway, such as a SALT gateway or GWWS 101, which can include a web service message engine, such as a SOAP engine 105, that can convert between web service messages and distributed transaction data structures; and a web service description component, such as a WSDL component 106, that can provide a description of distributed transaction services to be used in creating web service clients 102 for accessing the distributed transaction services from a distributed transaction service infrastructure, such as a Tuxedo infrastructure 103. The distributed transaction service architecture gateway, such as a SALT gateway or GWWS 101, operates to invoke distributed transaction services upon receiving a request from a web service client 102.

In addition to basic Web service protocols, distributed transaction service architecture such as BEA SALT can comply with most primary Web services specifications: WS-ReliableMessaging and WS-Addressing, SOAP 1.1, SOAP 1.2, and WSDL 1.1, allowing distributed transaction service architecture such as BEA SALT to interoperate with other Web service products and development toolkits.

Major benefits of Web services include:
a. Interoperability among distributed applications that span diverse hardware and software platforms
b. Easy, widespread access to applications using Web protocols
c. A cross-platform, cross-language data model (XML) that facilitates developing heterogeneous distributed applications For example, with BEA SALT, one can easily export existing Tuxedo services as Web services without having to perform any programming tasks. BEA SALT is configuration-driven and does not require programming changes to access Tuxedo services. In addition because BEA SALT is a native Tuxedo Web service, it can reduce the conversion process that may exist with other solutions for accessing Tuxedo services.

In one embodiment of the present invention, the computer enabled system that can expose distributed transaction services as web services to a client 102 can have another service architecture gateway.

In another embodiment of the present invention, a plug-in mechanism can be associated with a transaction service architecture gateway, such as a SALT gateway 101 to expand functionality of the transaction service architecture gateway 101. In addition, such a plug-in mechanism can be dynamically loaded into the transaction service architecture gateway 101.

In one embodiment of the present invention, a service contract information repository, such as a Metadata Repository in SALT, can be associated with both the SALT gateway 101 and Tuxedo infrastructure 103.

Configuration-Driven Deployment

One embodiment of the present invention is a computer enabled method to expose distributed transaction services as web services from a service architecture that comprising steps of: configuring the service architecture 202; receiving an invocation request through web services from a client 204; invoking a distributed transaction service from a distributed transaction application 209, and exporting the distributed transaction service in the form of web services 211. The distributed transaction service is defined in the invocation request.

In one embodiment of the present invention, the web services can use SOAP/HTTP.

In one embodiment of the present invention, the computer enabled method can further comprise a step of defining and describing the distributed transaction service 201. In another embodiment of the present invention, the computer enabled method to expose distributed transaction services as web services can further comprise a step to configure and boot the distributed transaction application 203.

In one embodiment of the present invention, the computer enabled method can further comprise a step of generating a web service description upon receiving a web services description request 205. In another embodiment of the present invention, the computer enabled method can further comprise a step of providing the web service description to a client, wherein the web service description is used to generate a client side stub-code 207.

In one embodiment of the present invention, a service architecture configuration file can be used to configure the transaction service architecture. The service architecture configuration file can define deployment information for exporting distributed transaction services as web services. Such deployment information can includes a set of distributed transaction service lists; service policy definitions such as WS-ReliableMessaging Policy; system level parameters such as SSL setup and thread pool; and multiple service architecture gateway instances that support failover.

SALT Configuration File

One example of a service architecture configuration file is a SALT configuration file. The BEA SALT configuration file allows one to specify a list of Tuxedo services that can be exposed as Web Services, policy information, and other system level information. One configuration file is used to represent a particular GWWS process or a group of failover GWWS processes.

In one example, the configuration file can be a single root XML file. Root element can be named <Configuration>, which can have four child elements, <Servicelist>, <Policy>, <System> and <WSGateway>.

Here, <Servicelist> element can be used to list Tuxedo services that will be exported as web services. <Policy> element can include varieties of service policy definition. For example, WS-ReliableMessaging Policy can be supported, so <RMPolicy> can be one optional sub element of <Policy>. <System> element can define system level parameters such as SSL setup and thread pool. <WSGateway> element can be used to define one or more GWWS gateway instances. These instances can share the same <Servicelist>, <Policy> and <System> configuration information.

A simple configuration file may look like this:

```
<? xml version="1.0" encoding="UTF-8"?>
<Configuration xmlns="http://www.bea.com/Tuxedo/SALT/200606" >
    <Servicelist id="simple">
        <Service name="toupper" />
        <Service name="tolower" />
    </Servicelist>
    <Policy>
        <RMPolicy>RMpolicy.xml</RMPolicy>
    </Policy>
    <System>
        <Certificate>
            <PrivateKey> cert.pem </PrivateKey>
        </Certificate>
    </System>
    <WSGateway>
        <GWInstance id="GW1">
            <HTTP address="//bjsol1:8001" />
            <HTTPS address="//bjsol3:8002" />
        </GWInstance>
    </WSGateway>
</Configuration>
```

Configuration Validating

There can be at least two approaches to validate a configuration file. One is defining all configuration grammar in an XML schema and validating the configuration file against the schema file; the other is using a software components that can provide the ability to validate configuration file against some basic rules instead of the whole schema file.

Configuration schema file can be used for the customer who wants to verify their own configuration file manually. One example of a configuration XML schema file can be a normative grammar description of the configuration file that the distributed transaction service architecture supports. Other configuration file and validating tools can be developed and used based on the grammar defined in the schema file.

On the other hand, any component that parses configuration file can use the latter approach to validate the configuration file. For example, in SALT, these components include GWWS, tmwsdlgen. Besides the configuration schema file, a set of basic validating rules are also defined. For each rule, check points and error behavior can be defined as following.

Basic document structure rules
/Configuration root element must exist
/Configuration/@namespace, the namespace of the configuration file must exist.
Configuration/Servicelist, /Configuration/Policy, /Configuration/System and /Configuration/WSGateway element must exist.
Service information rules
/Configuration/Servicelist/@id must be specified.
/Configuration/Servicelist/Service occurrence can be 0 or more. 0 means current configuration will not export any service.
/Configuration/Servicelist/Service/@name value validation, should follow the Tuxedo service naming rules: @name value must exist, character length <=15
/Configuration/Servicelist/Service/@name, the corresponding service should be able to locate from the Metadata Repository from local Tuxedo domain.
Metadata Repository System Service is available. Metadata Repository service must be available before SALT configuration being loaded.
Policy information rules
/Configuration/Policy/RMPolicy, only the first occurrence is parsed, and the value should be a valid file path name and the actual file can be accessed.

RMPolicy file should be a well-formed XML file.
System information rules
/Configuration/System/Certificate/PrivateKey must exist and the value is not empty if its parent element (Certificate) is present.
WSGateway information rules
/Configuration/WSGateway/GWInstance occurrence can be 1 or more.
/Configuration/WSGateway/GWInstance/@id must be specified.
/Configuration/WSGateway/GWInstance/@id value must be unique within the configuration file.
/Configuration/WSGateway/GWInstance sub element <HTTP> and <HTTPS>, at least one must be specified.
/Configuration/WSGateway/GWInstance/HTTP(S)/@address must be specified and attribute value must be in format "//xxx:xx".

Configuration Dynamic Loading

In one embodiment of the present invention, the transaction service architecture can be configured dynamically. For example, in SALT, changes in configuration can be reflected in GWWS without restarting the process. A configuration dynamic reloading mechanism can be implemented. The configuration reloading operation needs not affect any accepted healthy SOAP requests, and new version configuration can take effect to the requests that take place after the reloading operation is finished.

In SALT, the reloading mechanism can support the following configuration information dynamical reloading:
<Servicelist> changes for a different Tuxedo service list scope;
Service contract information changes stored in Metadata Repository for exported Tuxedo services;
In one example, any other configuration items, including RM Policy definitions, system level parameters, etc, may not be reloaded when GWWS is running. However, the GWWS process can support a reloading time window, which means that there may be more than one configuration instances coexistence while GWWS is running.

In addition, a command can be provided to activate the refreshment. For example, in SALT, this command can be a sub command within the SALT Administration Command Interpreter. The corresponding GWWS bundled configuration file and/or Metadata Repository service definition can be updated first before this command is executed. The result can be printed on the console when the command is finished.

WSDL Document Generation and Publishing

Web Services Description Language (WSDL) is an XML-based specification that describes a Web service. A WSDL document describes Web service operations, input and output parameters, and how a client application connects to the Web service.

For example, in SALT, the WSDL document can be automatically generated as part of the SALT Web services development process without the need to generate it manually. The generated WSDL document can be integrated using Web services development tools or can be published to a UDDI server.

There are two approaches to obtaining the WSDL document in SALT:
d. using the WSDL document file generating utility, tmwsdlgen.
e. downloading the WSDL document provided by the GWWS server via HTTP.

Figure 3:
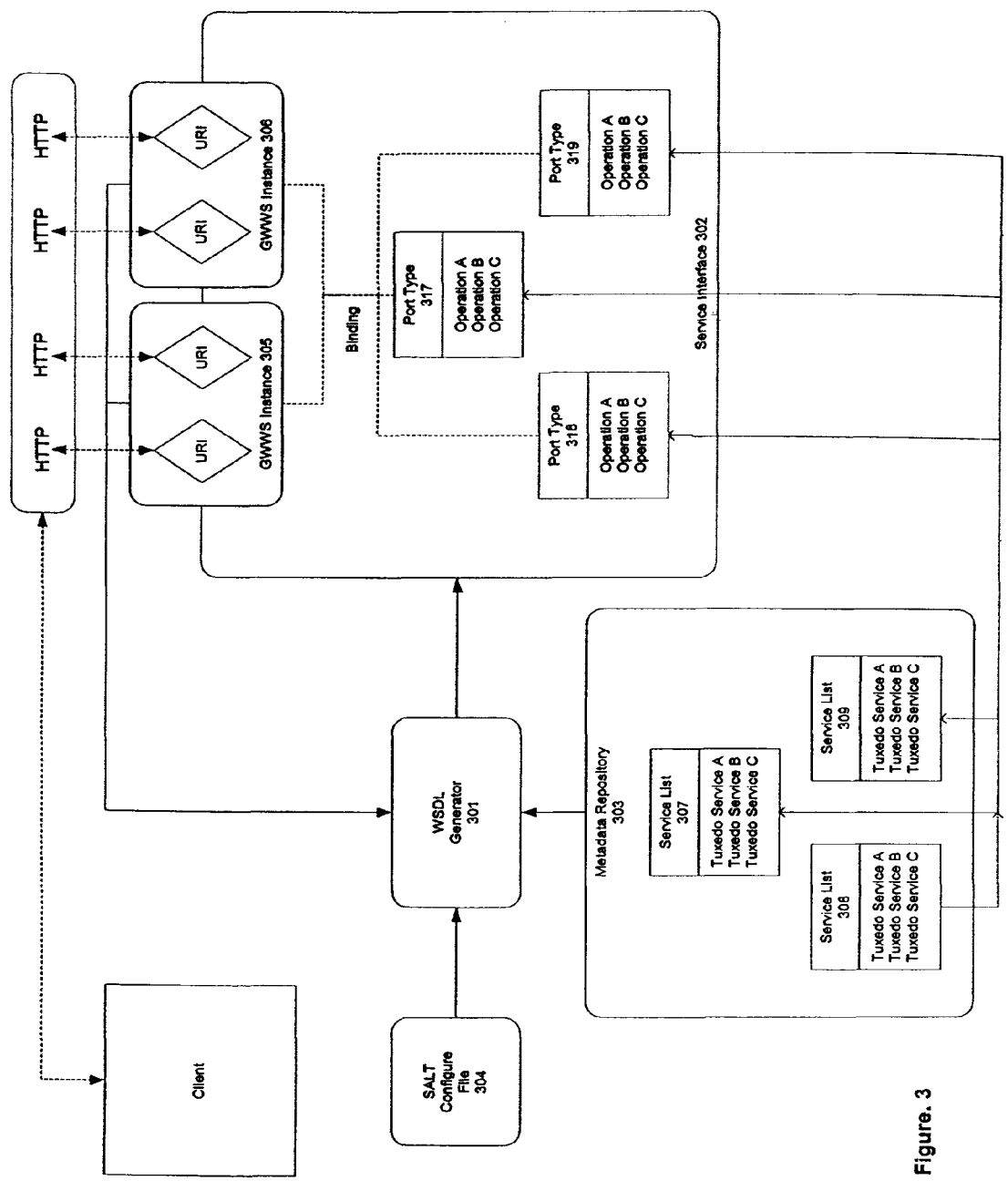
FIG. 3 is an exemplary illustration of the generation of a WSDL file for a service interface using a WSDL generator in accordance with one embodiment of the invention.

As shown in FIG. 3, a WSDL generator 301 can be used to generate a WSDL file for a service interface 302 based on:

f. a Metadata repository 303 which contains the definition and description of the distributed transaction service;

g. a service architecture configuration file 304; and h. a service architecture gateway environment including one or more GWWS server instances 305 and 306.

For example, SALT can provide a command, tmwsdlgen, which reads GWWS configuration file and generates a WSDL file. tmwsdlgen can provide the interface specified in the attached utility manual page. The command can specify particular encoding style and SOAP version used in generated WSDL. This is also a way of getting validated information described using WSDL grammar. If the configuration file contains serious grammar errors, the command can exit with no WSDL file generated. The information indicating the detail grammar error can be displayed on the console. Since tmwsdlgen needs to access Tuxedo Metadata Repository service, so tmwsdlgen command will be a Tuxedo native client program.

In one embodiment of the present invention, the web service description component can expose distributed transaction services based on a set of mapping rules. the set of mapping rules includes one or more of:

i. basic mapping rules;

j. abstract message definition rules;

k. abstract definition rules;

l. SOAP/HTTP binding rules; and m. WS policy attachment rules.

For example, the details of each individual rule as used in SALT can be found in Appendix A. It will be apparent to those skilled in the art that other types of rules can be used without limitation.

In one embodiment of the present invention, the transaction service architecture gateway can maintain a latest suite of auto-generated web service description of the distributed transaction services and downloadable from a URL.

For example, SALT getaway server or GWWS, can maintain a latest suite of auto-generated WSDL files. GWWS can support a specific HTTP GET request from any Web service client to download WSDL file. GWWS can accept the SOAP version and encoding style indication for different formatted WSDL files.

In the case of SALT, users can download the latest WSDL file from the following URL:

"http(s)://<host>:<port>/
wsdl[?[SOAPversion=<1.1 | 1.2> ] [&encstyle=<doc | rpc >
][&mappolicy=<pack|raw>][&toolkit=<wls|axis>]]"

In the above URL string, n. "SOAPversion" is the argument used to specify the SOAP version for generated WSDL file, if not present, "1.1" will be used as default value.

o. "encstyle" is the argument used to specify the encoding style for generated WSDL file, if not present, "doc" will be used as default value.

p. "mappolicy" is the argument used to specify the data mapping policies for some certain Tuxedo Typed buffer for generated WSDL file. Currently, this option has impact to CARRAY typed buffer only. If the argument is not present, "pack" will be used as default value.

q. "toolkit" is the argument only take effect when "mappolicy=raw". It is used to generate proper WSDL description for MIME attachment for CARRAY typed buffer. SALT will only support Weblogic server and Axis at this release regarding SOAP with Attachment. The default value for "toolkit" is "wls".

Metadata Repository

In one embodiment of the present invention, the transaction service architecture gateway is associated with a service contract information repository such as a Tuxedo service Metadata Repository. The service contract information repository can contain a service list that includes one or more distributed transaction service corresponding to one or more operations in the web service description of the distributed transaction services.

For example, the Tuxedo service metadata repository contains BEA Tuxedo service definitions that allow Tuxedo clients to access BEA Tuxedo service parameter information. It provides Tuxedo application developers and administrators the ability to store and retrieve detailed service parameter information on any or all Tuxedo application services.

The Tuxedo service metadata repository is designed to process interactive queries by developers and administrators during application development or modification. It can also be designed to process high volumes of automated queries during the application production phase.

Five utilities can be used in conjunction with the Tuxedo service metadata repository:

r. TMMETADATA(5): Tuxedo service metadata repository server. It provides one service, .TMMETAREPOS, which uses an FML32 input and output buffer format described in METAREPOS(5);

s. tmloadrepos(1): creates or updates the binary metadata repository file and loads it with service parameter information.

t. tmunloadrepos(1): displays service information from the Tuxedo service metadata repository. Output can be optionally specified as plain text format, WSDL format, or C pseudocode u. tpgetrepos(3c): programmatically uses FML32 buffers to output service information from the Tuxedo service metadata repository v. tpsetrepos(3c): programmatically uses FML32 buffers to add, delete, or update service parameter information to the metadata repository file GWWS—Transaction Service Architecture Gateway Server Transaction service architecture gateway server, such as a BEA SALT GWWS server, can be a configuration-driven process which does not require any programming tasks for most basic Web service applications. In addition, the functionality of a transaction service architecture gateway server can be enhanced by developing plug-in interfaces which, for example, utilizes custom typed buffer data and customized shared libraries to extend the GWWS server.

Figure 4:
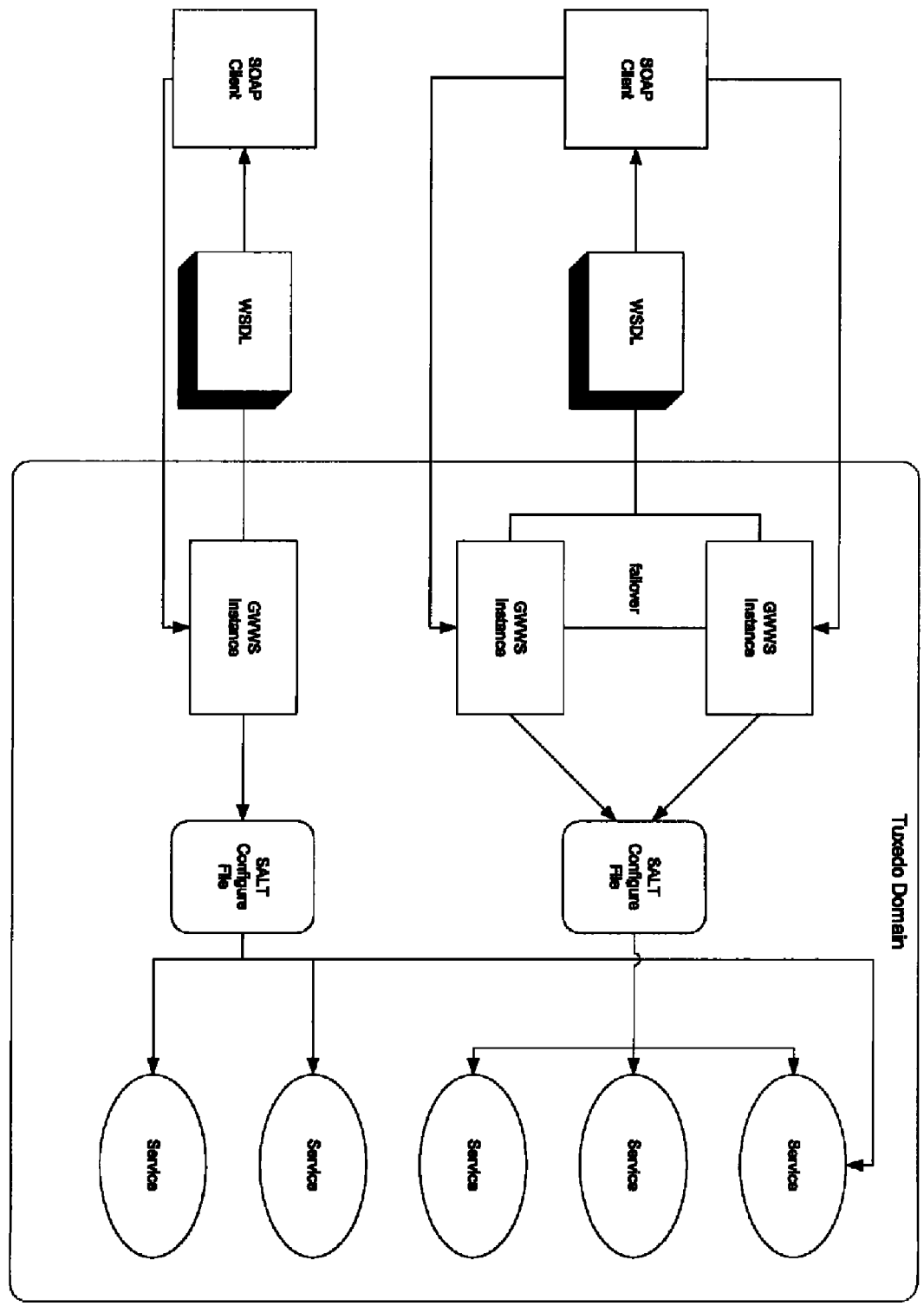
FIG. 4 is an illustration of an exemplary framework of BEA Service Architecture Leveraging Tuxedo (SALT) with multiple Web Service Gateway Server (GWWS) instances within one Tuxedo domain as an example for distributed transaction service architecture in accordance with one embodiment of the present invention.
Figure 5:
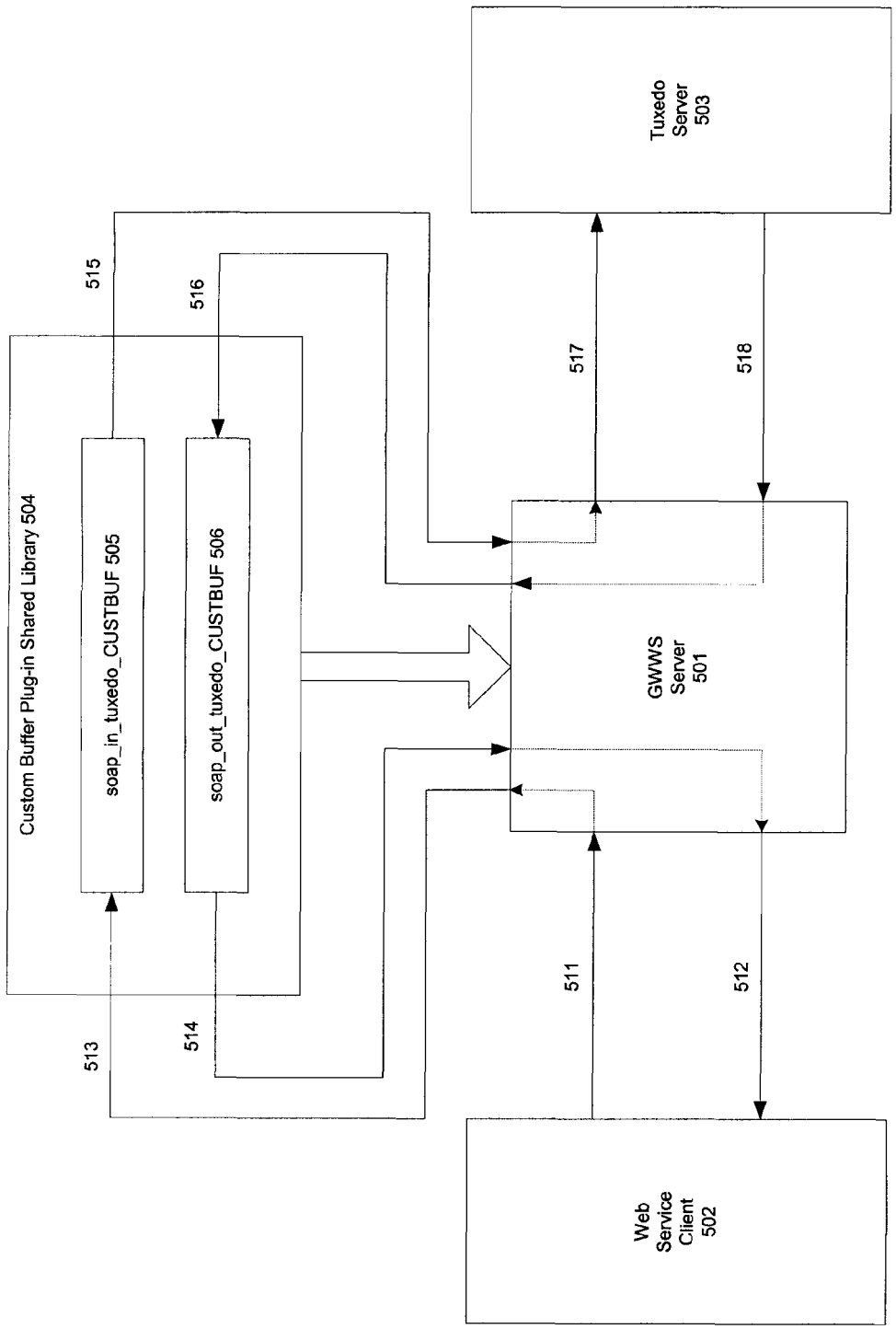
FIG. 5 is an exemplary illustration of a plug-in mechanism that allows customers to have their own implementation on converting between SOAP XML message and Tuxedo custom typed buffer in accordance with one embodiment of the invention.

In one example, as shown in FIG. 4, BEA SALT provides a Tuxedo system server, GWWS, which can handle Web service SOAP messages over HTTP/S protocol. The GWWS server can act as a Tuxedo gateway process and can be managed in the same manner as general Tuxedo system servers. SOAP request messages can be parsed by the GWWS server, converted into Tuxedo typed buffers, and dispatched to corresponding Tuxedo services. The Tuxedo response typed buffers returned by the Tuxedo services can be converted to SOAP response messages by GWWS and sent back to the client side. A typed buffer plug-in mechanism in GWWS can handle custom defined buffer types.

As also shown in FIG. 4, multiple GWWS instances can be used in one Tuxedo domain. The same functionality for multiple GWWS instances is provided by specifying the same BEA SALT configuration file to improve throughput and failover protection. One can also group multiple GWWS instances in different configuration files for different purposes.

As also shown in FIG. 4, when the GWWS server boots, it loads the specified configuration, which includes reading the configuration XML file, validating the XML file, loading corresponding Tuxedo service contract information from the Tuxedo Service Metadata Repository, and loading the WS-ReliableMessaging policy definition file. The GWWS server can reload the configuration dynamically at runtime. One can also download the WSDL document file from the GWWS server (which is based on the latest BEA SALT configuration file being used by the GWWS process).

One embodiment of the present invention is a computer enabled transaction service architecture gateway system for exposing distributed transaction services as web services, comprising a transaction service gateway server, such as a GWWS server 501, which includes a web service message engine to convert between web service messages sent by a web service client 502 and distributed transaction data structures used by a distribute transaction server such as a Tuxedo server 503; and interface for allowing customized plug-in mechanism to expand functionality and provide additional service. The transaction service architecture gateway server, such as a GWWS server 501, operates to invoke distributed transaction services on a distribute transaction server such as a Tuxedo server 503 upon receiving a request from a web service client 502.

In one embodiment of the present invention, the web service messages use SOAP/HTTP. In one embodiment of the present invention, the transaction service gateway server, such as a GWWS server 501, supports two way communication between a web service client 502 and a distribute transaction server such as a Tuxedo server 503.

In one embodiment of the present invention, multiple instance of transaction service gateway servers, wherein the multiple instance of transaction service gateway servers support failover capability.

Plug-In Mechanism

One embodiment of the present invention is a computer enabled method for exposing distributed transaction services as web services using plug-in mechanism, comprising:
 w. receiving a web service message as a request;
 x. selecting an plug-in mechanism;
 y. using the plug-in mechanism to prepare for invoking distributed transaction services;
 z. invoking distributed transaction services;
 aa. using the selected plug-in mechanism to prepare for responding to web service client; and
 bb. responding to the web service client via a web service message.

In addition, the computer enabled method for exposing distributed transaction services as web services can further comprise one or more steps of:
 cc. initiating a plug-in mechanism;
 dd. setting a table for actual business logic functions;
 ee. implementing actual business logic functions; and
 ff. exiting a plug-in mechanism;

In one embodiment of the present invention, the computer enabled method can include a further step of defining an interface for the plug-in mechanism in a configuration file.

In one embodiment of the present invention, the plug-in mechanism allows usage of data types not defined within distributed transaction services. The plug-in mechanism allows usage of security tools such as authentication tools not defined within distributed transaction services. The plug-in mechanism allows usage of a handler not defined within distributed transaction services.

Plug-In Shared Library

In one embodiment of the present invention, the plug-in mechanism allows dynamic loading of plug-in shared library.

For example, in SALT, the plug-in shared library can include a set of plug-in implementation functions and a set of plug-in register functions. The set of plug-in implementation functions can include functions to convert between web service messages and distributed transaction service data structures. The set of plug-in register functions includes one or more of: initiating functions; exiting functions; and vtable setting functions.

A plug-in interface is a set of functions exported by a shared library that can be loaded and invoked by GWWS processes to achieve special functionality. BEA SALT provides a plug-in framework as a common interface for defining and implementing a plug-in interface. Plug-in implementation is carried out by a shared library which contains the actual functions. The plug-in implementation library is configured in the SALT configuration file and is loaded dynamically during GWWS server startup.

Four plug-in elements can be used to define a plug-in interface:
 gg. Plug-in ID
 hh. Plug-in Name
 ii. Plug-In Implementation Functions
 jj. Plug-in Register Functions The plug-in ID element is a string used to identify a particular plug-in interface function. Multiple plug-in interfaces can be grouped with the same Plug-in ID for a similar function. Plug-in ID values are predefined by BEA SALT. Arbitrary string values are not permitted. For example, BEA SALT 1.1 can support the P_CUSTOM_TYPE plug-in ID, which can be used to define plug-in interfaces for custom typed buffer data handling.

The plug-in Name differentiates one plug-in implementation from another within the same Plug-in ID category. For the P_CUSTOM_TYPE Plug-in ID, the plug-in name is used to indicate the actual custom buffer type name. When the GWWS server, attempts to convert data between Tuxedo custom typed buffers and an XML document, the plug-in name is the key element that searches for the proper plug-in interface.

Actual business logic should reflect the necessary functions defined in a plug-in vtable structure. Necessary functions may be different for different plug-in ID categories. For the P_CUSTOM_TYPE ID category, two functions need to be implemented:

---

CustomerBuffer *(*soap_in_tuxedo_CUSTBUF)(char *, CustomerBuffer *, char *);
int (*soap_out_tuxedo_CUSTBUF)(char **, CustomerBuffer *, char *);

---

Plug-in Register functions are a set of common functions (or rules) that a plug-in interface can implement so that the GWWS server can invoke the plug-in implementation. Each plug-in interface can implement three register function These functions are:
a. Initiating Function
b. Exiting Function
c. vtable Setting Function Here, the initiating function can be immediately invoked after the plug-in shared library is loaded during GWWS server startup. Developers can initialize data structures and set up global environments that can be used by the plug-ins.

Returning a 0 value can indicate the initiating function has executed successfully. Returning a value other than 0 can indicate initiation has failed. The GWWS server can start once plug-in interface initiation successes.

As an example, the initiating function uses the following syntax:

```
int __ws_pi_init_@ID@_@Name@(char * params, void **priv_ptr);
```

Where @ID@ indicates the actual plug-in ID value; @Name@ indicates the actual plug-in name value. For example, the initiating function of a plug-in with P_CUSTOM_TYPE as a plug-in ID and MyType as a plug-in name is:

```
__ws_pi_init_P_CUSTOM_TYPE_MyType (char * params,
   void **priv_ptr).
```

The exiting function can be called before closing the plug-in shared library when the GWWS server shuts down. All reserved plug-in resources can be released.

The exiting function uses the following syntax:

```
int __ws_pi_exit_@ID@_@Name@(void * priv);
```

Where @ID@ indicates the actual plug-in ID value; @Name@ indicates the actual plug-in name value. For example, the initiating exiting function name of a plug-in with P_CUSTOM_TYPE as a plug-in ID and MyType as a plug-in name is:

```
__ws_pi_exit_P_CUSTOM_TYPE_MyType(void * priv).
```

A virtual table, vtable, is a particular C structure that stores the necessary function pointers for the actual businesses logic of a plug-in interface. In other words, a valid plug-in interface must implement all the functions defined by the corresponding virtual table, the vtable.

The vtable setting function uses the following syntax:

```
int __ws_pi_set_vtbl_@ID@_@Name@(void * priv);
```

Where @ID@ indicates the actual plug-in ID value; @Name@ indicates the actual plug-in name value. For example, the vtable setting function of a plug-in with P_CUSTOM_TYPE as a plug-in ID and MyType as a plug-in name is:

```
__ws_pi_set_vtbl_P_CUSTOM_TYPE_MyType(void * priv).
```

The vtable structures can be different for different plug-in ID categories. For example, P_CUSTOM_TYPE is the one valid plug-in ID for BEA SALT. The vtable structure for P_CUSTOM_TYPE plug-in interfaces is shown in List 1.

List 1. custtype_vtable Structure

```
struct custtype_vtable {
   CustomerBuffer *(*soap_in_tuxedo__CUSTBUF)(char *,
   CustomerBuffer *, char *);
   int (*soap_out_tuxedo__CUSTBUF)(char **, CustomerBuffer *,
   char *);
};
``` struct custtype_vtable indicates that two functions need to be implemented for a P_CUSTOM_TYPE plug-in interface.

The function input parameter void * priv points to a concrete vtable instance. One can set the vtable structure with the actual functions within the vtable setting function.

An example of setting the vtable structure with the actual functions within the vtable setting function is shown in List 2.

List 2. Setting the vtable Structure with Actual functions within the vtable Setting Function

```
int __DLLEXPORT__
__ws_pi_set_vtbl_P_CUSTOM_TYPE_MyType (void * vtbl)
{
   struct custtype_vtable * vtable;
   if ( ! vtbl )
      return -1;
   vtable = (struct custtype_vtable *) vtbl;
   vtable->soap_in_tuxedo__CUSTBUF = ConvertXML_2_MyType;
   vtable->soap_out_tuxedo__CUSTBUF = ConvertMyType_2_XML;
   userlog(" setup vtable for custom type %s", type_name);
   return 0;
}
```

To develop a comprehensive plug-in interface, one can take the following steps:
kk. developing a shared library to implement the plug-in interface;
ll. defining the plug-in interface in SALT configuration file; and
mm. developing a Plug-in Shared Library To develop a plug-in shared library, one can take the following steps:
nn. writing C language plug-in implementation functions for the actual business logic. These functions are not required to be exposed from the shared library;
oo. writing C language plug-in register functions that include: the initiating function, the exiting function and the vtable setting function. These register functions need to be exported so that they can be invoked from the GWWS server.
pp. Compile all the above functions into one shared library.

To define a plug-in shared library that is loaded by the GWWS server, the corresponding plug-in interface information can be configured in the BEA SALT configuration file. An example of how to define plug-in information in the BEA SALT configuration file is shown in List 3.

List 3. Defined Plug-In in the BEA SALT Configuration File

```
<?xml version="1.0" encoding="UTF-8"?>
<Configuration xmlns="http://www.bea.com/Tuxedo/SALT/200606">
    <Servicelist id="sample">
        <Service name="custom_type_svc1"/>
    </Servicelist>
    <Policy/>
    <System>
      <Plugin>
         <Interface>
            <ID>P_CUSTOM_TYPE</ID>
            <Name>MYTYPE</Name>
            <Library>mytype_plugin.so</Library>
         </Interface>
      </Plugin>
    </System>
    <WSGateway>
     <GWInstance id="GWWS1">
        <HTTP address="//my host"/>
     </GWInstance>
    </WSGateway>
</Configuration>
```

When a Tuxedo service requires an input custom typed buffer, the GWWS server can automatically look for the proper custom type name vtable structure:
 a. The vtable soap_in_tuxedo_CUSTBUF function is invoked to convert the SOAP XML payload to a custom typed buffer instance.
 b. The vtable soap_out_tuxedo_CUSTBUF function is invoked to convert a custom typed buffer instance to a SOAP XML payload.
SOAP Engine In one embodiment of the present invention, the web service message engine is a SOAP engine that converts between SOAP messages and distributed transaction data structures such as Tuxedo Typed Buffers. The SOAP engine can support the conversion between complex types in a SOAP message and Tuxedo Typed Buffers such as FML, FML32, VIEW, VIEW32. The SOAP engine supports a Custom Typed Buffer using a Custom Buffer plug-in shared library.

For example, in SALT, each Tuxedo buffer type can be described using XML type system (XML schema) in the generated WSDL file so that Tuxedo service's request/response data can be represented with regular XML format. The input data in XML format can be automatically converted into Tuxedo typed buffers according to the corresponding buffer type schema definitions. The converted typed buffers can be used as the input of the Tuxedo service. Any typed buffer returned by the Tuxedo service can be converted into XML format and returned to the web service client in SOAP response message.

In SALT, each SALT configuration file can define one or more GWWS instances. Each particular configuration file maps to a single SOAP/WSDL web service object in the component model of WSDL specification. Each GWWS process defined in the configuration serves as a lower level port object of the service object. Each Tuxedo application service defined for exposing through the configuration will be treated as an operation of the WSDL service object. Configuring multiple GWWS instances within the SALT configuration file is the right way to deploy failover capability among multiple GWWS instances.

In SALT, when a SOAP request is received by GWWS, it will be dispatched to the corresponding Tuxedo service. The local name of the first element in request message's SOAP body will be treated as the web service's operation name. It will determine the actual tuxedo native service to be called. The input data will be converted into Tuxedo typed buffer and used as input buffer for a tuxedo native call to that service. For example, if a request is as below:

```
<? xml version="1.0" encoding="UTF-8"?>
<SOAP-ENV:Envelope
   xmlns:SOAP-ENV="http://schemas.xmlsoap.org/soap/envelope/"
   xmlns:SOAP-ENC="http://schemas.xmlsoap.org/soap/encoding/"
   xmlns:xsi="http://www.w3.org/2001/XMLSchema-instance"
   xmlns:xsd="http://www.w3.org/2001/XMLSchema"
   xmlns:ns="urn:tuxedo_typedef">
<SOAP-ENV:Body
SOAP-ENV:encodingStyle="http://schemas.xmlsoap.org/soap/encoding/">
  <ns:toupper>
     <inbuf>abc</inbuf>
  </ns:toupper>
</SOAP-ENV:Body>
</SOAP-ENV:Envelope>
```

It can be dispatched to service named 'toupper' with a STRING typed buffer containing 'abc' as the input (assume element 'inbuf is defined as type xsd:string in the generated WSDL). If the service is not defined or not reachable, a Receiver SOAP fault can be generated.

For example, the details of each individual rule as used in SALT for XML to/from Tuxedo Buffer conversion can be found in Appendix B. It will be apparent to those skilled in the art that other types of rules can be used without limitation.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

APPENDIX A

This section describes the rules that converting configuration information into WSDL specification compliant information.

Basic mapping rules
/wsdl:definitions/wsdl:types
Use XML schema as type system
/wsdl:definitions/wsdl:message
Each instance maps to a specific Tuxedo service input buffer or output buffer
/wsdl:definitions/wsdl:portType
Only one instance in the generated WSDL, all Tuxedo services defined in the certain configuration instance can be grouped in one WSDL portType object.
/wsdl:definitions/wsdl:portType/wsdl:operation
Each instance maps to a specific Tuxedo service
/wsdl:definitions/wsdl:binding
Only one instance in the generated WSDL, which indicates that, only one concrete SOAP protocol, either soap 1.1 binding extension or soap 1.2 binding extension, can be provided for the WSDL binding in the generated WSDL.
/wsdl:definitions/wsdl:service
Only one instance in the generated WSDL
/wsdl:definitions/wsdl:port
One or more instances in the generated WSDL, depends on the GWWS instance number used for failover.

WSDL target Namespace
The target Namespace of the generated WSDL file can be composed with the following format:

"urn:<Servicelist_ID>.wsdl".

The first GWWS instance's network parameters can be used.
Namespace conventions
If namespace prefix definition is needed to be included in the generated WSDL, the following table can be applied for prefix definition.

| Prefix | Namespace |
|---|---|
| Xsd | http://www.w3.org/2001/XMLSchema |
| wsdl | http://schemas.xmlsoap.org/wsdl |
| soap11 | http://schemas.xmlsoap.org/wsdl/soap |
| soap12 | http://schemas.xmlsoap.org/wsdl/soap12 |
| Wsp | http://schemas.xmlsoap.org/ws/2004/09/policy |
| wsrm | http://schemas.xmlsoap.org/ws/2005/02/rm |
| beapolicy | http://www.bea.com/wsrm/policy |

Abstract message definition rules
In Salt, two traditional message encoding styles for SOAP messages: Document style and RPC style are supported. Mapping rules from Tuxedo service contract definition to WSDL abstract message definition for each style can be described respectively as following after some common rules to define Tuxedo typed buffers/parameters using XML schema can be defined.
Buffer type/parameter type and XML schema mapping rules
The targetNamespace can be constructed with the following string format:

"urn:<pack | raw>.<Servicelist_ID>_typedef.salt11"

"pack" or "raw" depends on the choice for WSDL generator on some certain Tuxedo typed buffer data mapping policies. "pack" represents the policy of using some encoding approach to wrap up the typed buffer raw data. "raw" represents the policy of using attachment mechanism to carry the original buffer stream. In one case, only CARRAY typed buffer has choices regarding the above policies. "pack" means use base64 encoding to CARRAY typed buffer, "raw" means use SOAP with attachment to CARRAY typed buffer.

The following table shows how to associate typed buffer with XML data type that might be defined in /wsdl:types/xsd:schema.

| Tuxedo Buffer Type | XML data type(#bufmappingtype) |
|---|---|
| STRING | xsd:string (Tuxedo STRING typed buffer can map to xsd:string directly, which means web service clients can send UTF-8 encoding xsd:string data if the Tuxedo services require STRING data.) |
| CARRAY | Option1: SwA(SOAP with attachment) (CARRAY buffer raw data can be carried within a |

-continued

| Tuxedo Buffer Type | XML data type(#bufmappingtype) |
|---|---|
| | MIME multipart/related message) |
| | Option2: xsd:base64Binary |
| MBSTRING | xsd:string |
| | (Tuxedo MBSTRING typed buffer can map to xsd:string directly, which means web service clients can send UTF-8 encoding xsd:string data if the Tuxedo services require MBSTRING data.) |
| FML | Each FML buffer definition associates with its service name so that the type name can be unique within the certain WSDL file. The name of the XML complex type can be composed with the format: "fml_<svcname>_<In \| Out>" The complex type can use <xs:sequence> pattern to describe each FML field resides in the FML buffer. |
| FML32 | Each FML32 buffer definition associates with its service name so that the type name can be unique within the certain WSDL file. The name of the XML complex type can be composed with the format: "fml32_<svcname>_<In \| Out>" The complex type can use <xs:sequence> pattern to describe each FML32 field resides in the FML32 buffer. |
| VIEW | Each view buffer definition associates with its view name so that the same view type can be defined with the same XML complex type. The name of the complex type is composed with the format: "view_<viewname(subtype)>" The schema for this view buffer type can be defined in /wsdl:types/xsd:schema section of the generated WSDL and must be only one instance. |
| VIEW32 | Each view32 buffer definition associates with its view name so that the same view32 type can be defined with the same XML complex type. The name of the complex type can be composed with the format: "view32_<viewname(subtype)>" The schema for this view32 buffer type can be defined in /wsdl:types/xsd:schema section of the generated WSDL and must be only one instance. |
| XML Custom type | xsd:anyType xsd:anyType. |

Associate Buffer parameters with XML data type

| Tuxedo Buffer Parameter type | XML data type(#parammappingtype) |
|---|---|
| BYTE | xsd:byte |
| CHAR | SALT built-in schema simpleType with name "tuxtype:char) |
| SHORT | xsd:short |
| INT | xsd:int |
| LONG | xsd:long |
| FLOAT | xsd:float |
| DOUBLE | xsd:double |
| STRING | xsd:string |
| CARRAY | xsd:base64Binary |
| MBSTRING | xsd:string |
| FML | Specific complex type with unique type name "fml_"+svcname + "_p" + seqnum. Note: the sequence number for each FML parameter shall be unique within a particular Tuxedo service contract. |
| FML32 | Specific complex type with unique type name "fml32_" + svcname + "_p" + seqnum. Note: the sequence number for each FML parameter shall be unique within a particular Tuxedo service contract. |
| VIEW | Specific complex type with unique type name "view_"+viewname(subtype)" |
| VIEW32 | Specific complex type with unique type name "view32_"+viewname(subtype) |
| XML | xsd:anyType |

Message style—"document"

The generated wsdl can describe the abstract message definition in "document" message style. Since the "document" style can represent SOAP messages in various XML document structures, so there's a lot of ways to define this document structure. For example, the following rules can be applied to Salt generated wsdl in order to make the message description in a fixed structure.

/wsdl:message/@name

The string of message name can be constructed with the following format:

<Tuxedo service name + "Input | Output">

Suffix "Input" can be used when describing an input typed buffer. Suffix "Output" can be used when describing an output typed buffer /wsdl:message/wsdl:part There can be only one <wsdl:part> instance associated with each Tuxedo typed buffer.

The value of "name" attribute of <wsdl:part> can be hard-coded as "parameters".

"element" attribute of <wsdl:part> can be specified. If the message indicating a Tuxedo service input buffer, the value can be the same as the associated tuxedo service name. If the message indicating a Tuxedo service output buffer, the value can be constructed with the associated tuxedo service name plus a suffix string "Response".

Schema definition for /wsdl:message/wsdl:part/@element

The element can be a <xsd:complexType>. In one example, we do not define the type name for this complex type and just describe the type structure inline. The reason can be that the type indicating a particular service buffer is not likely to be reused for other elements, hence no need to define a type name for reference.

The <xsd:complexType> can include only one element with name related Tuxedo typed buffer name.

The type name of the buffer type element can comply with the rules described as above.

If the buffer type is "VIEW|VIEW32|FML|FML32|custom type" and parameters are described for the above buffer type, the "#bufmappingtype" definition can include elements with each element specifies a parameter.

Elements representing buffer parameters can use parameter name as element name and the type for the element can comply with the rules described as above.

Message style—"rpc"

The generated wsdl can support to describe the abstract message definition in "rpc" message style. The following rules can be applied to Salt generated wsdl if the SOAP message can be constructed in rpc style.

/wsdl:message/@name

The string of message name can be constructed with the following format:

<Tuxedo service name+"Input|Output">

Suffix "Input" can be used when describing an input typed buffer. Suffix "Output" can be used when describing an output typed buffer /wsdl:message/wsdl:part There can be only one <wsdl:part> instance associated with each Tuxedo input message. The value of "name" attribute of <wsdl:part> can be hard-coded as "inbuf"

There can be only one <wsdl:part> instance associated with each Tuxedo output message. The value of "name" attribute for the <wsdl:part> can be hard-coded as "outbuf"

"type" attribute of <wsdl:part> shall be specified. The type name of the buffer type element can comply with the rules described as above.

If the buffer type is "VIEW|VIEW32|FML|FML32|custom type" and parameters are described for the above buffer type, the "#bufmappingtype" definition can include elements with each element specifies a parameter.

Elements representing buffer parameters shall use parameter name as element name and the type for the element can comply with the rules described as above.

Abstract operation definition rules

WSDL 1.1 specification uses <wsdl:portType> to define a set of abstract operations. Associating Tuxedo service with <wsdl:portType> definition can use the following rules.

The value of "name" attribute can be composed with the following format:

| "<Servicelist_id>_PortType" |
| --- |

The string value of attribute "name" can be the same as the associated Tuxedo service name.

Tuxedo service type and SOAP MEP can comply with the following mapping rules.

| Tuxedo service type(defined in Metadata Repository) | SOAP Message Exchange Pattern | Necessary elements for <wsdl:operation> |
| --- | --- | --- |
| service/queue | Request-Response | <input> <output> |
| oneway | One-way | <input> |

The generated WSDL may not include special SOAP fault message format, the primitive SOAP fault grammar defined by W3C SOAP specification can used.

SOAP/HTTP binding rules

/soap:binding extension
  /soap:binding extension can be attached under element <wsdl:binding>
  The value of attribute "transport" can indicate the HTTP transport URI defined by either SOAP 1.1 or SOAP 1.2.
  The value of attribute "style" can reflect the configured style in GWWS configuration file.

/soap:operation extension
  /soap:operation extension can be attached under element /wsdl:binding/wsdl:operation
  Attribute "soapAction" can be defined with the string of the corresponding service name, i.e. operation name.
  The value of attribute "style" can reflect the configured style specified either in GWWS configuration file or in the input option of command tmwsdlgen(1).

/soap:body extension
  /soap:body extension can be attached under element /wsdl:binding/wsdl:operation/wsdl:input or /wsdl:binding/wsdl:operation/wsdl:output
  Attribute "parts" can be defined, including all parts in message definition.
  The value of attribute "use" depends on the message style. If the message style is "document", value of "use" can be "literal". If the message style is "rpc", value of "use" can be "encoded".
  Attribute "encodingStyle" can be defined with default SOAP encoding style URI if the attribute "use" is "encoded".
  Attribute "namespace" can be defined if the attribute "use" is "encoded", the value can be "urn:<pack raw>.<Servicelist_ID>_typedef.salt11"

/soap:address extension
  /soap:address extension can be attached under element /wsdl:service/wsdl:port
  The value of attribute "location" can be composed with the following format:
  "http(s)://<host>:<port>/<Servicelist_ID>"
  If both HTTP and HTTPS protocol are specified by GWWS or tmwsdlgen, then there can be two /wsdl:service/wsdl:port, one for http endpoint and the other for https endpoint. /soap:address value can be composed with the following format:
  "http(s)://<host>:<port>/<Servicelist_ID>".

WS Policy attachment rules

Each WS policy file content can be excerpted completely and attached as child elements of <wsdl:definitions> with the top element as <wsp:Policy>.

Each policy expression can define attribute "wsu:id" with a unique id name.

<wsp:UsingPolicy> element is mandatory and can be a child element of <wsdl:definitions>. The format of <wsp:UsingPolicy> can be a fixed format as follows: <wsp:UsingPolicy wsdl:required="true"/>

Policy Reference attached point rules

| Policy definition point | Attached point (as child element of . . . ) |
| --- | --- |
| /Configuration/Policy/RMPolicy | /wsdl:binding |

APPENDIX B

XML to/from Tuxedo Buffer Conversion

GWWS can automatically convert SOAP message into Tuxedo buffer types and vice versa. Salt provides a set of rules of describing Tuxedo Typed Buffer via XML document. These rules can be based on the characteristics of various Tuxedo buffer types. These rules can be exported as xml schema definitions in Salt WSDL files so that web service client developers do not need to have knowledge of Tuxedo Buffer Types.

STRING Typed Buffer

Tuxedo STRING typed buffer is used to store character string that terminates with a NULL character. Tuxedo STRING typed buffer is a kind of self-describing buffer.

XML schema built-in type "xs:string" can be the corresponding type for buffer data stored in a SOAP message. In SOAP message, the XML element who encapsulates the actual string data, can be defined with "xs:string" directly or with "xs:simpleType" based on "xs:string".

GWWS gateway process has the limitation of reading XML document, that is the XML document can only encoded with "UTF-8". So, in one example, both web service client side and Tuxedo server side need to make sure the transferred data stream is encoding as "UTF-8" character set.

Tuxedo STRING data type can be specified with a max byte length in Metadata Repository; if Tuxedo has such definition, corresponding SOAP message can also be enforced with this limitation. In one example, SALT WSDL generator may not have "xs:maxLength" restrict facet in the generated WSDL file, since the max byte length specified in Metadata Repository cannot easily convert to a maximum character length value that needed by "xs:maxLength" attribute in the generated WSDL file. But GWWS will validate the actual message byte length according to Metadata Repository's definition, if the byte length exceeded, an SOAP fault message will be returned.

Example: Tuxedo Service "TOUPPER" accepts STRING typed buffer, part of the SOAP message looks like the following:

```
<?xml ... encoding="UTF-8" ?>
......
<SOAP:body>
    <m:TOUPPER xmlns:m="urn:......">
        <inbuf>abcdefg</inbuf>
    </m:TOUPPER>
</SOAP:body>
```

The XML schema for element <inbuf>

```
<xs:element name="inbuf" type="xs:string" />
```

CARRAY Typed Buffer

Tuxedo CARRAY typed buffer can be used to store array of characters, any of which can be NULL. This typed buffer is used to handle the data opaquely. CARRAY buffer is not self-describing.

Since there might be different purpose of using CARRAY typed buffer by the customers, Tuxedo web service stack can support at least two mapping rules at the same time.

One rule is that CARRAY buffer raw data can be carried within a MIME multipart/related message, which is defined in "SOAP Messages with Attachments" Specification. MIME Content-Type "application/octet-stream" or "text/xml" can be the data format type represented in the attachment, which depends on which web service client side toolkit is used. In one example, SOAP with Attachment rule is only interoperable with BEA Weblogic server and Apache Axis. For Weblogic server, MIME content-type "text/xml" can be used. For Axis, MIME content-type "application/octet-stream" can be used.

The other rule is that CARRAY buffer data can be encoded as base64Binary data and embedded into the SOAP body.

Since the WSDL representation for the above two rules are purely different, so WSDL generator utility and WSDL download URL can provide the information of switching between the two different styled WSDL. In one example, a web service client toolkit can use either WSDL format (if support) to compose client program and invoke the Tuxedo service from the same GWWS endpoint. In another word, a running GWWS process can support both CARRAY mapping rules, parse SOAP request and compose SOAP response according to which WSDL the client message is used.

CARRAY data type can be specified with a max byte length; if Tuxedo has such definition, corresponding SOAP message can also be enforced with this limitation. In one example, SALT WSDL generator may not has "xs:maxLength" restrict facet in the generated WSDL file, but GWWS can validate the byte length according to Metadata Repository's definition.

EXAMPLE 1

Base64 Mapping

Tuxedo Service "TOUPPER" accepts CARRAY typed buffer, part of the SOAP message looks like the following:

```
<SOAP:body>
    <m:TOUPPER xmlns:m="urn:......">
        <inbuf>QWxhZGRpbjpvcGVuIHNlc2FtZQ==</inbuf>
    </m:TOUPPER>
</SOAP:body>
```

The XML schema for element <inbuf>

```
<xs:element name="inbuf" type="xs:base64Binary" />
```

EXAMPLE 2

MIME Attachment Mapping

Tuxedo Service "TOUPPER" accepts CARRAY typed buffer, part of the SOAP message looks like the following:

```
MIME-Version: 1.0
Content-Type: Multipart/Related; boundary=MIME_boundary;
type=text/xml;
    start="<claim061400a.xml@example.com>"
Content-Description: This is the optional message description.
--MIME_boundary
Content-Type: text/xml; charset=UTF-8
Content-Transfer-Encoding: 8bit
Content-ID: <claim061400a.xml@ example.com>
<?xml version='1.0' ?>
<SOAP-ENV:Envelope
xmlns:SOAP-ENV="http://schemas.xmlsoap.org/soap/envelope/">
<SOAP-ENV:Body>
..
<m:TOUPPER xmlns:m="urn:...">
<inbuf href="cid:claim061400a.carray@example.com"/>
</m:TOUPPER>
..
</SOAP-ENV:Body>
</SOAP-ENV:Envelope>
--MIME_boundary
Content-Type: text/xml
Content-Transfer-Encoding: binary
Content-ID: <claim061400a. carray @example.com>
...binary carray data...
--MIME_boundary--
The WSDL for carray typed buffer will look like the following:
<wsdl:definitions ...>
<wsdl:types ...>
    <xsd:schema ...>
        <xsd:element name="inbuf" type="xsd:base64Binary" />
    </xsd:schema>
</wsdl:types>
......
<wsdl:binding ...>
    <wsdl:operation name="TOUPPER">
        <soap:operation ...>
        <input>
            <mime:multipartRelated>
                <mime:part>
                    <soap:body parts="..." use="..."/>
                </mime:part>
                <mime:part>
                    <mime:content part="..." type="text/xml"/>
                </mime:part>
```

-continued

```
            </mime:multipartRelated>
        </input>
        ......
    </wsdl:operation>
  </wsdl:binding>
</wsdl:definitions>
```

MBSTRING Typed Buffer

Tuxedo MBSTRING Typed Buffer can used for character array of multi-byte characters. A Tuxedo MBSTRING buffer can have the following three elements: the code-set character encoding, the data length, the character array of the encoding.

XML schema built-in type "xs:string" can be the corresponding type for buffer data stored in a SOAP message.

As we already mentioned in STRING typed buffer section, GWWS may only accept "UTF-8" encoding XML document. So for any web service client that wants to access Tuxedo services with MBSTRING buffer, the mbstring payload can be represented as "UTF-8" encoding in the SOAP request message. In one example, GWWS can transparently pass the "UTF-8" character set string into the Tuxedo service with MBSTRING Typed buffer format, by which means it's up to the actual Tuxedo services to handle the UTF-8 string.

For any Tuxedo response MBSTRING Typed buffer (with any encoding character set), GWWS can automatically transform the string into "UTF-8" encoding and send back to the web service client side.

Tuxedo MBSTRING data type can be specified with a max byte length in Metadata Repository; if Tuxedo has such definition, corresponding SOAP message can also be enforced with this limitation. In one example, SALT WSDL generator may not have "xs:maxLength" restrict facet in the generated WSDL file, but GWWS can validate the byte length according to Metadata Repository's definition.

Example:

Tuxedo Service "MBSERVICE" accepts MBSTRING typed buffer, part of the SOAP message looks like the following:

```
<?xml ... encoding="UTF-8" ?>
<SOAP:body>
    <m: MBSERVICE xmlns:m="http://......">
        <inbuf>こんにちは</inbuf>
    </m: MBSERVICE>
</SOAP:body>
```

The XML schema for element <inbuf>

```
<xs:element name="inbuf" type="xs:string" />
```

XML Typed Buffer

Tuxedo XML typed buffer is used to store xml document.

XML schema built-in type "xs:anyType" can be corresponding type for XML document stored in a SOAP message, by which means the customers can encapsulate any well-formed XML data within the SOAP message.

GWWS can validate the actual XML data is well-formed or not, but may not do any other enforcement validation, such as schema validate, etc.

Only single root XML buffer may be allowed storing in the SOAP body. GWWS can check this. It's up to the customer to make sure the actual XML data is encoded with "UTF-8" character set. Any prolog information of the original XML document cannot be carried within the SOAP message.

XML data type can be specified with a max byte length; if Tuxedo has such definition, corresponding SOAP message should also be enforced with this limitation. In one example, SALT WSDL generator may not have "xs:maxLength" restrict facet in the generated WSDL file, but GWWS can validate the byte length according to Metadata Repository's definition.

Example:

Tuxedo Service "STOCKINQ" accepts XML typed buffer, the original XML data looks like the following:

```
<?xml version="1.0" encoding="UTF-8"?>
<!-- "Stock Quotes". -->
<stockquotes>
    <stock_quote>
        <symbol>BEAS</symbol>
        <when>
            <date>01/27/2001</date>
            <time>3:40PM</time>
        </when>
        <change>+2.1875</change>
        <volume>7050200</volume>
    </stock_quote>
</stockquotes>
```

Then part of the SOAP message can look like the following:

```
<SOAP:body>
    <m: STOCKINQ xmlns:m="urn:......">
        <inbuf>
<stockquotes>
    <stock_quote>
        <symbol>BEAS</symbol>
        <when>
            <date>01/27/2001</date>
            <time>3:40PM</time>
        </when>
        <change>+2.1875</change>
        <volume>7050200</volume>
    </stock_quote>
</stockquotes>
        </inbuf>
    </m: STOCKINQ >
</SOAP:body>
```

The XML schema for element <inbuf>

```
<xs:element name="inbuf" type="xs:anyType" />
```

VIEW/32 Typed Buffer

Tuxedo VIEW and VIEW32 typed buffer is used to store C structure defined by Tuxedo applications. Tuxedo customers need to define the VIEW structure with the VIEW definition files. A VIEW buffer type can define multiple fields. The following table shows the field types that supported by VIEW and VIEW32 data type in Tuxedo applications.

| | |
|---|---|
| VIEW supported field types | short, int, long, float, double, char, string, carray, dec_t |
| VIEW32 supported field types | short, int, long, float, double, char, string, carray, dec_t, mbstring |

To represent VIEW/32 data type with XML format, each VIEW or VIEW32 data type can be defined as an XML schema complex type. Each view field can be one or more sub elements of the XML schema complex type. The name of the sub element can be the view field name. The occurrence of the sub element depends on the "count" attribute of the view field definition. The value of the sub element should be in the view field data type's corresponding xml schema type. The following table shows the field types and the corresponding XML schema type.

| VIEW/32 field data type | XML schema type |
|---|---|
| short | xs:short |
| int | xs:int |
| Long | xs:long |
| float | xs:float |
| double | xs:double |
| char (defined as "byte" in metadata) | xs:byte |
| char (defined as "char" in metadata) | xs:string with restriction (maxlength = 1, value scope is visible ASCII characters, i.e. \u0020-\u007E) |
| string | xs:string |
| carray | xs:base64Binary |
| mbstring | xs:string |
| Dec_t | N/A (not support in this release) |

Environment that is necessary for converting XML to/from VIEW 16/32, i.e. system VIEW directory and system VIEW definition files can be automatically loaded by GWWS. VIEW typed buffer can be initiated only if user sets up the environment correctly.

WSDL generator process can check the consistency between Metadata VIEW/32 parameter definition and VIEW/32 file definition. If any inconsistency found, WSDL generator can report warning and the VIEW/32 definition can be used directly in the generated WSDL file.

VIEW Field type "dec_t" can be supported. That means if customers define VIEW fields with type "dec_t" or "mbstring", the service can be exported as web services.

In one example, although Metadata Repository can define a "size" attribute for "string/mbstring" typed parameters, the maximum byte length that allowed in the Tuxedo typed buffer, SALT may not expose such restriction in the generated WSDL file, since the byte length value cannot be directly used as string character length value in the WSDL file.

Tuxedo primary data type "long" can be indefinite between 32-bit and 64-bit scope according to different platforms. But the corresponding xs:long schema type can be used to describe 64-bit numeric value. Customers can get a SOAP fault in the following case: The GWWS runs with the 32-bit mode, and web service client sends a "xs:long" typed data which exceeds the 32-bit value range.

XML schema complex type for view uses "xs:sequence" as the sub element group model. So data mapping process will check if the sequence of the sub element is accordant with the view definition, SOAP requests with inconsistent sequence will be treated as wrong messages.

Example:
Tuxedo Service "MYVIEW" accepts VIEW typed buffer. The VIEW definition is:

| VIEW MYVIEW | | | | | | |
|---|---|---|---|---|---|---|
| #type | cname | fbname | count | flag | size | null |
| float | float1 | — | 1 | — | — | 0.0 |
| double | double1 | — | 1 | — | — | 0.0 |
| long | long1 | — | 3 | — | — | 0 |
| string | string1 | — | 2 | — | 20 | '\0' |
| END | | | | | | |

Part of the SOAP message looks like the following:

```
<SOAP:body>
    <m: STOCKINQ xmlns:m="http://......">
        <inbuf>
            <float1>12.5633</float1>
            <double1>1.3522E+5</double1>
            <long1>1000</long1>
            <long1>2000</long1>
            <long1>3000</long1>
            <string1>abcd</string1>
            <string1>ubook</string1>
        </inbuf>
    </m: STOCKINQ >
</SOAP:body>
```

The XML schema for element <inbuf>

```
<xs:complexType name=" view_MYVIEW">
    <xs:sequence>
        <xs:element name="float1" type="xs:float" />
        <xs:element name="double1" type="xs:double" />
        <xs:element name="long1" type="xs:long" minOccurs="3" />
        <xs:element name="string1" type="xs:string minOccurs="2" />
    </xs:sequence>
</xs: complexType >
<xs:element name="inbuf" type="tuxtype:view_MYVIEW" />
```

FML/32 Typed Buffer

Tuxedo FML and FML32 typed buffer is Proprietary BEA Tuxedo system type of self-describing buffer in which each data field carries its own identifier, an occurrence number, and possibly a length indicator.

An FML or FML32 buffer can define multiple fields. The following table shows the field types that supported by FML and FML3232 data type in Tuxedo applications.

| | |
|---|---|
| FML supported field types | char(FLD_CHAR), short (FLD_SHORT), long(FLD_LONG), float(FLD_FLOAT), double(FLD_DOUBLE), string(FLD_STRING), carray(FLD_CARRAY) |
| FML32 supported field types | char(FLD_CHAR), short (FLD_SHORT), long(FLD_LONG), float(FLD_FLOAT), double(FLD_DOUBLE), string(FLD_STRING), carray(FLD_CARRAY),ptr(FLD_PTR), mbstring(FLD_MBSTRING), FML32(FLD_FML32), VIEW32(FLD_VIEW32) |

To represent FML/32 data type with XML format, each FML or FML32 buffer should be defined as a unique XML schema complex type. Please note, FML/FML32 buffer does not like VIEW buffer, VIEW buffer definition can be reused by indicating the same VIEW structure name, but so far FML/FML32 buffer definition does not provide a reuse mechanism that can be reference between Tuxedo services. FML/FML32 buffer can only have basic data-dictionary like definition for each basic field data. So a particular FML/FML32 buffer definition should be applied for each FML/FML32 buffer with a different type name.

Each FML/FML32 field should be one or more sub elements within the FML/FML32 buffer xml schema type. The name of the sub element is the FML field name. The occurrence of the sub element depends on the "count" and "requiredcount" attribute of the fml/fml32 field definition. The value of the sub element should be in the fml/fml32 field data type's corresponding xml schema type. The following table shows the field types and the corresponding XML schema type.

| FML/32 field data type | XML schema type |
|---|---|
| short | xs:short |
| long | xs:long |
| float | xs:float |
| double | xs:double |
| char (defined as "byte" in metadata) | xs:byte |
| char (defined as "char" in metadata) | xs:string with restriction (maxlength = 1, value scope is visible ASCII characters, i.e. \u0020-\u007E) |
| string | xs:string |
| carray | xs:base64Binary |
| mbstring | xs:string |
| ptr | N/A |
| view32 | tuxtype:view_<viewname> |
| fml32 | tuxtype:fml32_<svcname>_p<SeqNum> |

As we explained in the above, if an embedded fml32 buffer is present in a FML32 buffer, the embedded fml32 buffer also needs to be defined as a unique xml complex type which has sub elements definitions. To avoid multiple embedded fml32 buffers in a FML32 buffer, a unique sequence number (<SeqNum>) is used to distinguish the embedded fml32 buffers.

Environment that is necessary for converting XML to/from FML 16/32, i.e. system FML field table file directory and system FML field definition files will be automatically loaded by GWWS. FML typed buffer can be handled only if user sets up the environment correctly.

WSDL generator process will check the consistency between Metadata FML/32 parameter type definition and FML/32 field table definition. If any inconsistency found, WSDL generator can report warning and the corresponding FML/32 field table definition will be used in the generated WSDL file.

In one example, although Metadata Repository may define a "size" attribute for "string/mbstring" typed parameters, the maximum byte length that allowed in the Tuxedo typed buffer, SALT will not expose such restriction in the generated WSDL file, since the byte length value cannot be directly used as string character length value in the WSDL file.

Tuxedo primary data type "long" can be indefinite between 32-bit and 64-bit scope according to different platforms. But the corresponding xs:long schema type is the used to describe 64-bit numeric value. So there might a SOAP fault if in the following case: The GWWS runs with the 32-bit mode, and web service client sends a "xs:long" typed data which exceeds the 32-bit value range.

XML schema complex type for fml/32 uses "xs:sequence" as the sub element group model. So data mapping process can check if the sequence of the sub element is accordant with the fml/32 buffer definition, SOAP requests with inconsistent sequence will be treated as wrong messages.

Example1 FML Buffer Data Mapping:

Tuxedo Service "TRANSFER" accepts FML typed buffer as input. The request fields needed for service LOGIN are listed below:

```
ACCOUNT_ID    1    long    /* 2 occurrences, The withdrawal
account is 1st, and the deposit account is 2nd */
AMOUNT        2    float   /* The amount to transfer */
```

Part of the SOAP message will look like the following:

```
<SOAP:body>
    <m: TRANSFER xmlns:m="urn:......">
        <inbuf>
            <ACCOUNT_ID>40069901</ ACCOUNT_ID >
            <ACCOUNT_ID>40069901</ ACCOUNT_ID >
            <AMOUNT>200.15</ AMOUNT >
        </inbuf>
    </m: TRANSFER >
</SOAP:body>
```

The XML schema for element <inbuf>

```
<xs:complexType name=" fml_TRANSFER_In">
    <xs:sequence>
        <xs:element name="ACCOUNT_ID" type="xs:long"
            minOccurs="2"/>
        <xs:element name=" AMOUNT" type="xs:float" />
    </xs:sequence>
</xs: complexType >
<xs:element name="inbuf" type="tuxtype: fml_TRANSFER_In" />
```

Example2 Embedded FML32 Buffer Data Mapping

Tuxedo Service "TRANSFER" accepts FML32 typed buffer as input. The request fields needed for service LOGIN are listed below:

```
CUST_INFO       1       fml32
    /* 2 occurrences, The withdrawal customer is 1st, and the deposit
    customer is 2nd */
ACCOUNT_INFO    2       fml32
    /* 2 occurrences, The withdrawal account is 1st, and the deposit
    account is 2nd */
AMOUNT          3       float
    /* The amount to transfer */
```

Each embedded CUST_INFO includes the following fields

| CUST_NAME | 10 | string |
|---|---|---|
| CUST_ADDRESS | 11 | carray |
| CUST_PHONE | 12 | long |

Each embedded ACCOUNT_INFO includes the following fields

| ACCOUNT_ID | 20 | long |
|---|---|---|
| ACCOUNT_PW | 21 | carray |

Part of the SOAP message will look like the following:

```
<SOAP:body>
    <m:STOCKTINQ xmlns:m="urn:......">
        <inbuf>
            <CUST_INFO>
                <CUST_NAME>John</CUST_NAME>
                <CUST_ADDRESS>Building
                15</CUST_ADDRESS>
                <CUST_PHONE>1321</CUST_PHONE>
            </CUST_INFO>
            <CUST_INFO>
                <CUST_NAME>Tom</CUST_NAME>
                <CUST_ADDRESS>Building
                11</CUST_ADDRESS>
                <CUST_PHONE>1521</CUST_PHONE>
            </CUST_INFO>
            <ACCOUNT_INFO>
                <ACCOUNT_ID>40069901</ACCOUNT_ID>
                <ACCOUNT_PW>abc</ACCOUNT_PW>
            </ACCOUNT_INFO>
            <ACCOUNT_INFO>
                <ACCOUNT_ID>40069901</ACCOUNT_ID>
                <ACCOUNT_PW>zyx</ACCOUNT_PW>
            </ACCOUNT_INFO>
            <AMOUNT>200.15</ AMOUNT >
        </inbuf>
    </m: STOCKINQ >
</SOAP:body>
```

The XML schema for element <inbuf>

```
<xs:complexType name=" fml32_TRANSFER_In">
    <xs:sequence>
        <xs:element name="CUST_INFO"
type="tuxtype:fml32_TRANSFER_p1" minOccurs="2"/>
        <xs:element name=" ACCOUNT_INFO"
type="tuxtype:fml32_TRANSFER_p2" minOccurs="2"/>
        <xs:element name=" AMOUNT" type="xs:float" />
    </xs:sequence>
</xs: complexType>
<xs:complexType name=" fml32_TRANSFER_p1">
    <xs:element name="CUST_NAME" type="xs:string" />
    <xs:element name="CUST_ADDRESS"
    type="xs:base64Binary" />
    <xs:element name="CUST_PHONE" type="xs:long" />
</xs:complexType>
<xs:complexType name=" fml32_TRANSFER_p2">
    <xs:element name="ACCOUNT_ID" type="xs:long" />
    <xs:element name="ACCOUNT_PW"
    type="xs:base64Binary" />
</xs:complexType>
 <xs:element name="inbuf" type="tuxtype:
 fml32_TRANSFER_In" />
```

X_C_TYPE Typed Buffer

X_C_TYPE buffer type is equivalent to VIEW buffer. The WSDL format is similar with VIEW buffer. It is transparent for SOAP client. Though X_C_TYPE is same with VIEW, in one example, Salt administrator may also need configure it in METADATA for particular Tuxedo service which uses this buffer type.

WSDL Piece Sample:

```
<xs:complexType name=" xc_c_type_MYVIEW">
  <xs:sequence>
    <xs:element name="float1" type="xs:float" />
    <xs:element name="double1" type="xs:double" />
    <xs:element name="long1" type="xs:long" minOccurs="3" />
    <xs:element name="string1" type="xs:string minOccurs="2" />
```

```
  </xs:sequence>
</xs: complexType>
<xs:element name="inbuf" type="tuxtype: xc_c_type_MYVIEW" />
```

Here "MYVIEW" is just an indication name and Salt will produce the name with rules conforming to other buffer type.

X_COMMON Typed Buffer

X_COMMON is equivalent to VIEW, but used for compatibility between COBOL and C programs. Field types can be limited to short, long, and string. METADATA can limit the acceptable field type then control the WSDL generation.

WSDL Piece Sample:

```
<xs:complexType name=" xc_common_MYVIEW">
  <xs:sequence>
    <xs:element name="short1" type="xs:short" />
    <xs:element name="long1" type="xs:long" minOccurs="3" />
    <xs:element name="string1" type="xs:string minOccurs="2" />
  </xs:sequence>
</xs: complexType>
<xs:element name="inbuf" type="tuxtype: xc_common_MYVIEW" />
```

X_OCTET Typed Buffer

X_OCTET buffer type is equivalent to CARRAY.

In one example, X_OCTET is only mapped to xs:base64Binary type.

Custom Typed Buffer

For custom typed buffer, Salt can provide a plug-in mechanism so that customers can have their own implementation on converting between SOAP XML message and Tuxedo custom typed buffer. Customers can validate the SOAP message against their own XML schema definition, allocate custom typed buffer, and parse data into the buffer and other operations.

XML schema built-in type "xs:anyType" can be corresponding type for XML document stored in a SOAP message. While using custom typed buffer, customers can define and represent the actual data into XML format and transferred between web service client and Tuxedo web service stack. Similar with XML Typed buffer, only single root XML buffer may be allowed storing in the SOAP body. GWWS will check this.

A common interface can be provided for defining and implementing plug-in. Definition of plug-in is a set of API that can be called in GWWS process. Implementation of the plug-in is a dynamic library which contains the real code of the functions and exports these functions. Implementation library can be loaded dynamically during GWWS startup. The functions can be registered as the implementation of plug-in interface. After loading an implementation of a plug-in, the call to the API of the plug-in will be directed to the functions in the library.

Definition of plug-in also includes the plug-in's ID, an arbitrary string (arbitrary in common sense, or to say in printable characters only) that differs the plug-in from the others.

Implementation can have still another attribute called 'name', which differs itself from other implementation of the same plug-in.

Implementation library can have an initializing function called _ws_pi_init_ID_Name( ), in which ID and Name are the ID of interface and name of the implementation. The function is called when being registered. The prototype of the initializing function is:

```
int __ws_pi_init_ID_Name(char * params, void. **priv_ptr);
```

In the function it can allocate all necessary resources and setup the vtable of itself (the vtable of interface will be setup by register function if needed). The first parameter is a string to be passed to library to initialize itself. Second parameter is to store private data that the implementation may need.

There can also be an exiting function

```
int __ws_pi_exit_ID_Name(void * priv);
``` which is called when the implementation is unregistered, and a function to setup vtable for interface:

```
int __ws_pi_set_vtbl_ID_Name(void *vtbl);
```

Customer Type plug-in can be the only plug-in defined in GWWS by now. Its function is to convert XML buffer to/from customer-defined Tuxedo typed buffer. As the typed buffer is defined and implemented by customer, the converting functions should also be implemented by customer.

The ID of the customer type plug-in is "Customer_Type". APIs of the plug-in are defined as:

```
typedef struct CustomerBuffer {
    char * buf;    /* Tuxedo buffer to be converted to/from XML */
    int len;       /* length of tbuf. If 0, the length is determined by the buffer itself*/
} CustomerBuffer;
struct custtype_vtable {
    CustomerBuffer    *(*soap_in_tuxedo_CUSTBUF)(char *xml, CustomerBuffer *tbuf, char * type);
    int (*soap_out_tuxedo_CUSTBUF)(char **xml, CustomerBuffer *tbuf, char * type);
};
```

Parameters:

```
xml - buffer or pointer to buffer that will contain XML message to be converted.
tbuf - Tuxedo buffer or pointer to tuxedo buffer that will contain Tuxedo customer defined typed buffer.
type - name of customer type
```

Each implementation of the customer type plug-in interface can be able to convert exactly one customer type (sub-type name does not matter). The name of the implementation can be the same as the supported customer type's type name.

What is claimed is:

1. A computer enabled system for exposing distributed transaction services as web services, comprising:
    a transaction service gateway server, running on one or more processors, that operates to invoke one or more distributed transaction services on a distributed transaction server upon receiving a request in a web service message from a web service client, wherein the transaction service gateway server includes:
        a web service message engine to handle the web service message for the one or more distributed transaction services; and
        a plug-in interface that expands functionality of the web service message engine; and
    a plug-in shared library, associated with the plug-in interface, that includes a set of plug-in implementation functions, wherein the plug-in library uses a virtual table that stores one or more function pointers to at least one said plug-in implementation function for the plug-in interface, and
    wherein the web service message engine operates to
        access the virtual table in the plug-in shared library through the plug-in interface and use the at least one said plug-in implementation function to convert the web service message into one or more distributed transaction data structures, and
        use another plug-in implementation function in the plug-in shared library to convert a response received from the distributed transactional server into another web service message for the web service client, wherein the response is associated with another one or more distributed transaction data structures.

2. The system according to claim 1, wherein:
the web service message uses a web service protocol.

3. The system according to claim 1, wherein:
the transaction service gateway server supports two way communication between the web service client and the distributed transaction server.

4. The system according to claim 1, wherein:
the plug-in shared library is dynamically loaded by the web service message engine using a plug-in mechanism.

5. The system according to claim 4, wherein:
the plug-in shared library includes a set of plug-in register functions.

6. The system according to claim 1, wherein:
the plug-in interface allows usage of data types not defined within the one or more distributed transaction services.

7. The system according to claim 1, wherein:
the plug-in interface allows usage of security tools not defined within the one or more distributed transaction services.

8. The system according to claim 1, wherein:
the plug-in interface allows usage of a handler not defined within the one or more distributed transaction services.

9. The system according to claim 1, wherein:
the web service message engine operates to convert between complex types in a web service message and complex distributed transaction data structures.

10. The system according to claim 1, further comprising:
the transaction service gateway server is in a group of transaction service servers, wherein the group of transaction service gateway servers support failover capability.

11. A computer enabled method for exposing distributed transaction services as web services using plug-in mechanism, comprising:
    receiving a request in a web service message, at a transaction service gateway server, from a web service client, wherein the transaction service gateway server operates to invoke one or more distributed transaction services on a distributed transaction server upon receiving the request from the web service client, and wherein the transaction service gateway server includes:
        a web service message engine to handle the web service message for the one or more distributed transaction services; and a plug-in interface that expands functionality of the web service message engine;

associating a plug-in shared library with the plug-in interface, wherein the plug-in shared library includes a set of plug-in implementation functions, wherein the plug-in library uses a virtual table that stores one or more function pointers to at least one said plug-in implementation function for the plug-in interface; and allowing the web service message engine to
access the virtual table in the plug-in shared library through the plug-in interface and use the at least one said plug-in implementation function to convert the web service message into one or more distributed transaction data structures, and use another plug-in implementation function in the plug-in shared library to convert a response received from the distributed transactional server into another web service message for the web service client, wherein the response is associated with another one or more distributed transaction data structures.

12. A non-transitory machine readable storage medium having instructions stored thereon that when executed cause a system to:

receive a request in a web service message, at a transaction service gateway server, from a web service client, wherein the transaction service gateway server operates to invoke one or more distributed transaction services on a distributed transaction server upon receiving the request from the web service client, and wherein the transaction service gateway server includes:

a web service message engine to handle the web service message for the one or more distributed transaction services; and a plug-in interface that expands functionality of the web service message engine;

associating a plug-in shared library with the plug-in interface, wherein the plug-in shared library includes a set of plug-in implementation functions, wherein the plug-in library uses a virtual table that stores one or more function pointers to at least one said plug-in implementation function for the plug-in interface; and allow the web service message engine to
access the virtual table in the plug-in shared library through the plug-in interface and use the at least one said plug-in implementation function to convert the web service message into one or more distributed transaction data structures, and use another plug-in implementation function in the plug-in shared library to convert a response received from the distributed transactional server into another web service message for the web service client, wherein the response is associated with another one or more distributed transaction data structures.

13. The system according to claim 1, wherein: the distributed transaction data structures are in a format that is specific to the distributed transaction server.

14. The system according to claim 1, wherein:
the virtual table is implemented using a programming language structure, and wherein the programming language structure indicates the set of plug-in implementation functions that need to be implemented for the plug-in interface in the plug-in shared library.

15. The system according to claim 1, wherein:
the set of plug-in implementation functions includes a plug-in initiating function, a plug-in exiting function, one or more plug-in setting functions.

16. The system according to claim 1, wherein:
the plug-in shared library is loaded in by the transaction service gateway server, and wherein the plug-in interface is defined by a configuration file.

17. The system according to claim 1, wherein:
the plug-in interface is associated with a different plug-in shared library that uses a different virtual table.

18. The system according to claim 1, wherein:
the transaction service gateway server can automatically look for a plug-in implementation function in the plug-in shared library to prepare input data in a specific data type for the distributed transaction server.

19. The system according to claim 1, wherein:
the web service message engine operates to publish a web service description of the one or more distributed transaction services based on a metadata repository associated with the distributed transaction server.

* * * * *

UNITED STATES PATENT AND TRADEMARK OFFICE
CERTIFICATE OF CORRECTION

| | | |
|---|---|---|
| PATENT NO. | : 8,001,246 B2 | Page 1 of 1 |
| APPLICATION NO. | : 11/867633 | |
| DATED | : August 16, 2011 | |
| INVENTOR(S) | : Lu et al. | |

It is certified that error appears in the above-identified patent and that said Letters Patent is hereby corrected as shown below:

In column 3, line 16-17, delete "Embodiment of the Present Invention is a Computer Enabled System" and insert -- embodiment of the present invention is a computer enabled system --, therefor.

In column 20, line 5-6, delete "<pack raw>" and insert -- <pack I raw> --, therefor.

In column 20, line 13, delete "ID> """ and insert -- ID>" --, therefor.

In column 20, line 19, delete "ID> "." and insert -- ID>". --, therefor.

In column 34, line 12-14, In Claim 13, delete "The system according to claim 1, wherein: the distributed transaction data structures are in a format that is specific to the distributed transaction server."
and
insert -- The system according to claim 1, wherein:
       the distributed transaction data structures are in a format that is specific to the distributed transaction server. --, therefor.

Signed and Sealed this
Sixth Day of December, 2011

David J. Kappos
*Director of the United States Patent and Trademark Office*